UNITED STATES PATENT OFFICE.

BERNHARD HEYMANN, OF ELBERFELD, GERMANY, ASSIGNOR TO THE FARBENFABRIKEN OF ELBERFELD COMPANY, OF NEW YORK.

BLUE DYE AND PROCESS OF MAKING SAME.

SPECIFICATION forming part of Letters Patent No. 606,212, dated June 28, 1898.

Application filed December 21, 1897. Serial No. 662,917. (Specimens.) Patented in England March 21, 1893, No. 6,035; in Germany December 3, 1893, No. 91,234; in France March 12, 1894, No. 227,675, and in Italy March 15, 1894, XXVIII, 35,937, LXX, 325.

*To all whom it may concern:*

Be it known that I, BERNHARD HEYMANN, doctor of philosophy, chemist, (assignor to the FARBENFABRIKEN OF ELBERFELD COMPANY, of New York,) residing at Elberfeld, Germany, have invented a new and useful Improvement in Blue Dye, (for which the Farbenfabriken, vormals Fr. Bayer & Co., has already obtained Letters Patent in Germany, No. 91,234, dated December 3, 1893; in France, No. 227,675, dated March 12, 1894; in England, No. 6,035, dated March 21, 1893, and in Italy, Reg. Gen., Vol. XXVIII, No. 35,937, Reg. Att., Vol. LXX, No. 325, dated March 15, 1894;) and I hereby declare the following to be a clear and exact description of my invention.

My invention relates to the production of a new blue dyestuff by allowing paramidodimethylanilinthiosulfo-acid to act on nitroso 2.7 oxynaphtoxyacetic acid, which has the formula

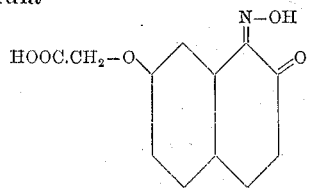

and has been described in the German Letters Patent No. 91,234, dated December 3, 1893, granted to the Farbenfabriken, vormals Friedrich Bayer & Co., of Elberfeld, Germany.

In carrying out my invention practically I can proceed as follows, (the parts are by weight:) A solution prepared by dissolving forty parts of the hydrochlorate of nitrosodimethylanilin in five hundred parts of water and seventy-five parts of a thirty-three-per cent. acetic acid is stirred into a boiling solution of one hundred parts of sodium thiosulfate in three thousand parts of water. Boiling is continued until the yellow color of the nitroso compound has disappeared, which will be the case after a short while. The solution of paramidodimethylanilinthiosulfo-acid thus obtained is cooled to 40° centigrade and mixed with fifty-four parts of the sodium salt of nitroso 2.7 oxynaphtoxyacetic acid. The resulting mixture is stirred for about twenty-four hours, keeping the temperature at about 40° centigrade, until the nitroso compound is no longer found to be contained therein. If this stage is reached, twenty-two parts of sodium carbonate ($Na_2CO_3$) are added, and the mixture is slowly heated to boiling. Subsequently the finished dyestuff, which has separated in the shape of dark particles, is filtered, washed with a small quantity of a diluted common-salt solution, dried and pulverized. It has most probably the following formula,

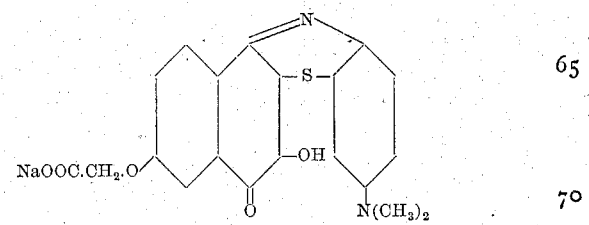

and represents a dark powder, difficultly soluble in cold water, more easily soluble in hot water, with a blue color. By concentrated sulfuric acid (60° Baumé) it is dissolved with a brown color, which changes into yellowish green on the addition of a small quantity of ice, while a dark-colored precipitate is obtained on adding a larger quantity of ice to the sulfuric-acid solution. The dyestuff dissolves in concentrated hydrochloric acid with a yellowish-green color, from which solution a violet flaky precipitate is obtained on the addition of water.

The new coloring-matter dyes chrome-mordanted wool bright-blue shades fast against light and milling.

Having now described my invention and in what manner the same is to be performed, what I claim as new, and desire to secure by Letters Patent, is—

1. The process for producing a new dyestuff which consists in causing paramidodimethylanilinthiosulfo-acid to act on nitroso 2.7 oxynaphtoxyacetic acid substantially as hereinbefore described.

2. As a new article of manufacture the new dyestuff having most probably the formula

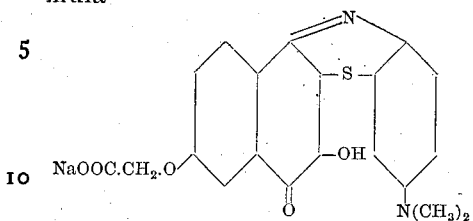

which is a dark powder soluble in hot water with a blue color, in concentrated sulfuric acid (66° Baumé) with a brown color which changes into yellowish green on the addition of a small quantity of ice, soluble in concentrated hydrochloric acid with a yellowish-green color from which solution a violet flaky precipitate is obtained on the addition of water, dyeing chrome-mordanted wool bright-blue shades fast against light and milling substantially as described.

In testimony whereof I have signed my name in the presence of two subscribing witnesses.

BERNHARD HEYMANN.

Witnesses:
R. E. JAHN,
OTTO KÖNIG.

It is hereby certified that in Letters Patent No. 606,212, granted June 28, 1898, upon the application of Bernhard Heymann, of Elberfeld, Germany, for an improvement in "Blue Dyes and Processes of Making Same," errors appear in the printed specification requiring correction, as follows: In lines 19-20, 47, and 93-4, page 1, the word "paramidodimethylanilinthiosulfo" should read *paraamidodimethylanilinthiosulfo*, and line 75, same page, the numerals and degree mark "60°" should read *66°;* and that the said Letters Patent should be read with these corrections therein that the same may conform to the record of the case in the Patent Office.

Signed, countersigned, and sealed this 12th day of July, A. D., 1898.

[SEAL.]
               WEBSTER DAVIS,
              *Assistant Secretary of the Interior.*

Countersigned:
 C. H. DUELL,
  *Commissioner of Patents.*